United States Patent
Bekritsky

(10) Patent No.: US 7,444,119 B2
(45) Date of Patent: Oct. 28, 2008

(54) METHOD FOR SHARING ANTENNAS OF A WIRELESS DEVICE

(75) Inventor: Benjamin Jay Bekritsky, Hollis, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 561 days.

(21) Appl. No.: 11/001,537

(22) Filed: Nov. 30, 2004

(65) Prior Publication Data

US 2006/0116182 A1    Jun. 1, 2006

(51) Int. Cl.
 *H04B 7/00* (2006.01)
(52) U.S. Cl. .......... 455/41.2; 455/553.1; 455/41.1; 455/552.1; 455/426.1; 327/268
(58) Field of Classification Search .......... 455/553.1, 455/41.1, 41.2, 552.1, 426.1; 327/268
See application file for complete search history.

(56) References Cited

U.S. PATENT DOCUMENTS

| | | | |
|---|---|---|---|
| 6,011,962 A | 1/2000 | Lindenmeier et al. | |
| 6,411,824 B1 * | 6/2002 | Eidson | 455/561 |
| 6,489,843 B1 * | 12/2002 | Nishijima et al. | 330/51 |
| 6,768,460 B2 | 7/2004 | Hoashi et al. | |
| 6,771,057 B1 | 8/2004 | Raddant | |
| 6,873,835 B2 * | 3/2005 | Kawaguchi | 455/277.1 |
| 2004/0038660 A1 * | 2/2004 | He et al. | 455/277.1 |
| 2004/0187156 A1 * | 9/2004 | Palm et al. | 725/81 |
| 2006/0025171 A1 * | 2/2006 | Ly et al. | 455/553.1 |
| 2007/0080736 A1 * | 4/2007 | Castaneda et al. | 327/268 |

* cited by examiner

*Primary Examiner*—Sanh D Phu
(74) *Attorney, Agent, or Firm*—Fay Kaplun & Marcin, LLP

(57) ABSTRACT

The present invention proposes novel antenna means mounted on handheld devices and methods of use of such antenna means with multiple radios. The novel antenna means exhibit smaller sizes, good performance, have higher reliability, and exhibit novel hardware configurations. The novel methods of utilization for the antenna means comprise the reception of an 802.11 RF signal to the antennas, the acquisition step while a radio is determining which antenna has the better signal and acquiring signal from that antenna, and usage by the Bluetooth signal of the remaining antenna.

27 Claims, 4 Drawing Sheets

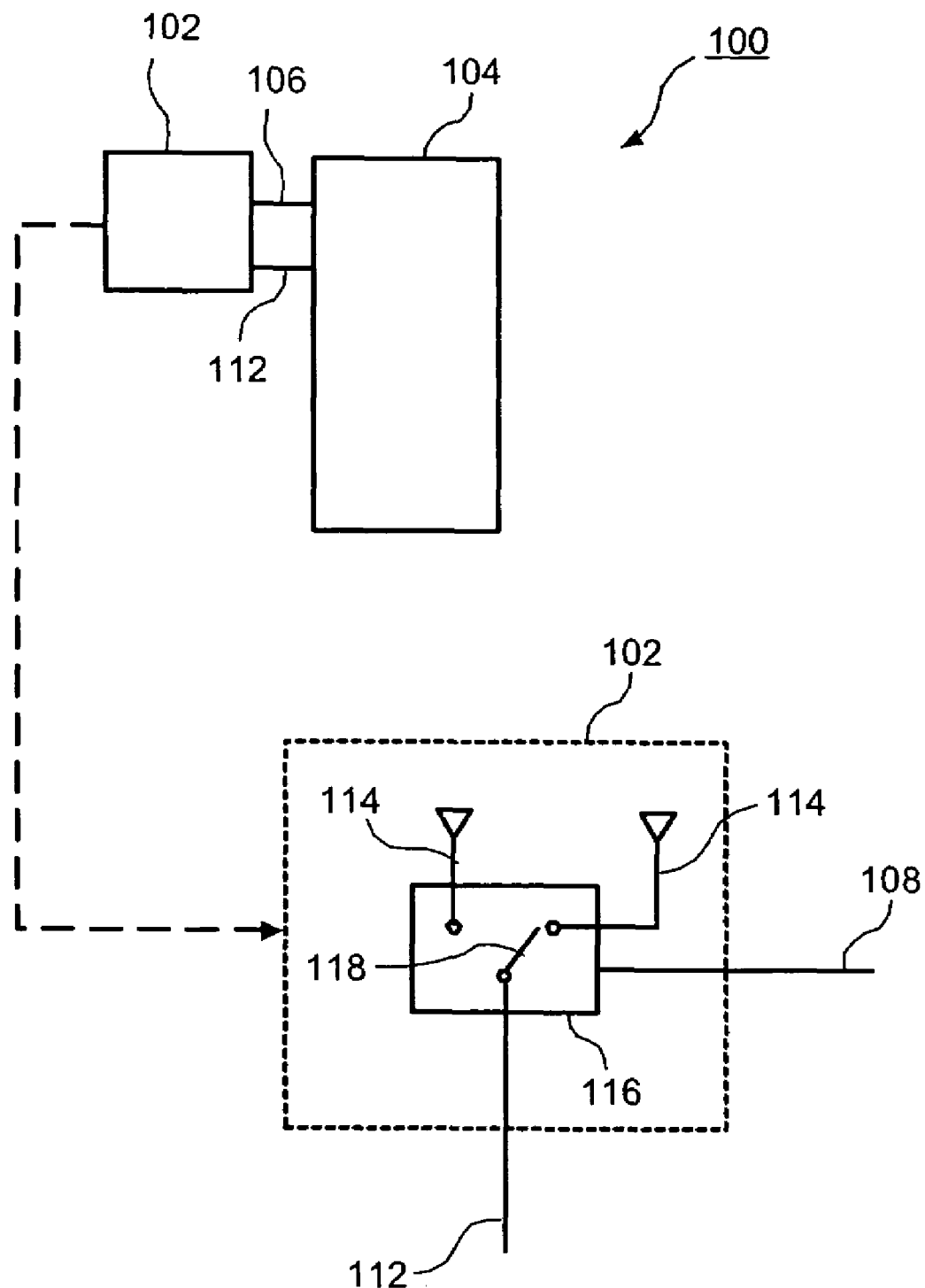
F I G. 1

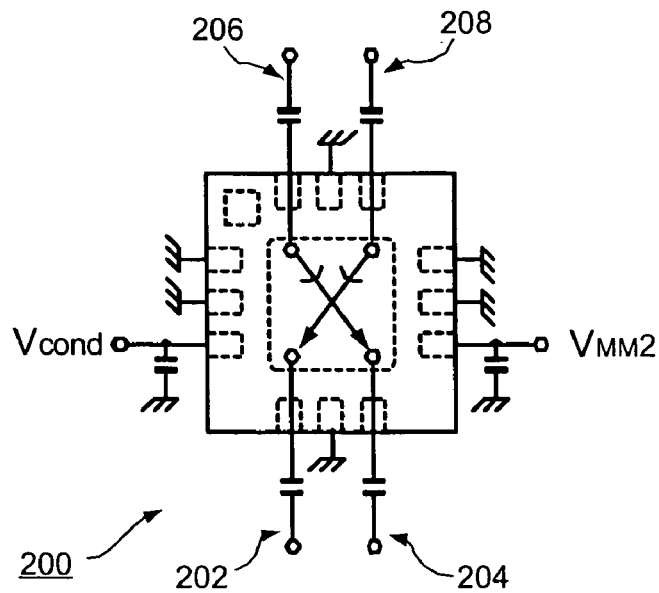
F I G. 2
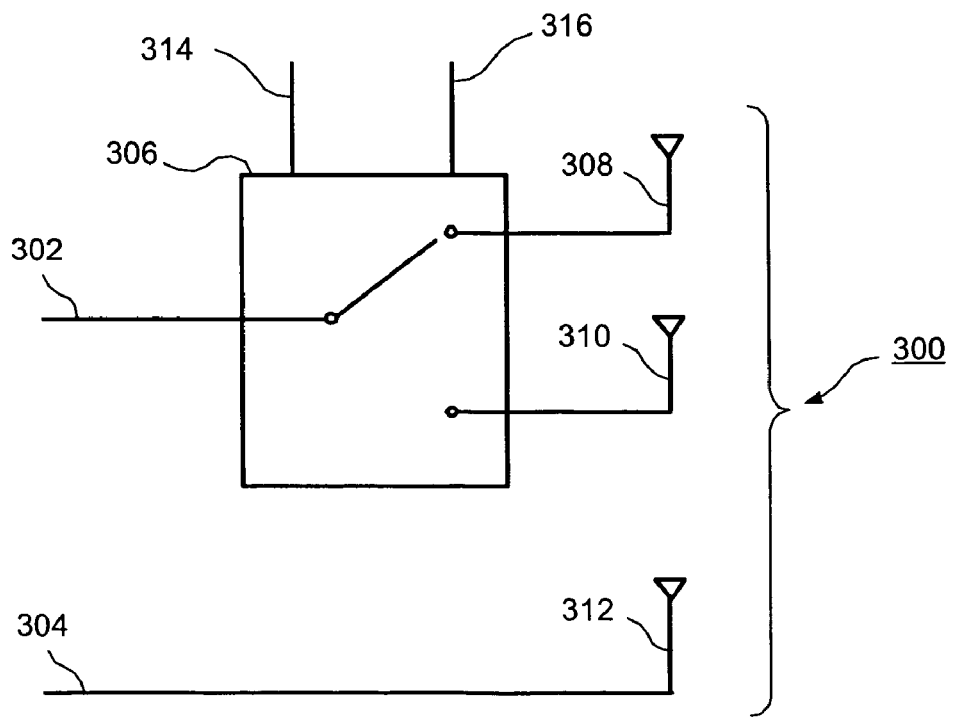
F I G. 3

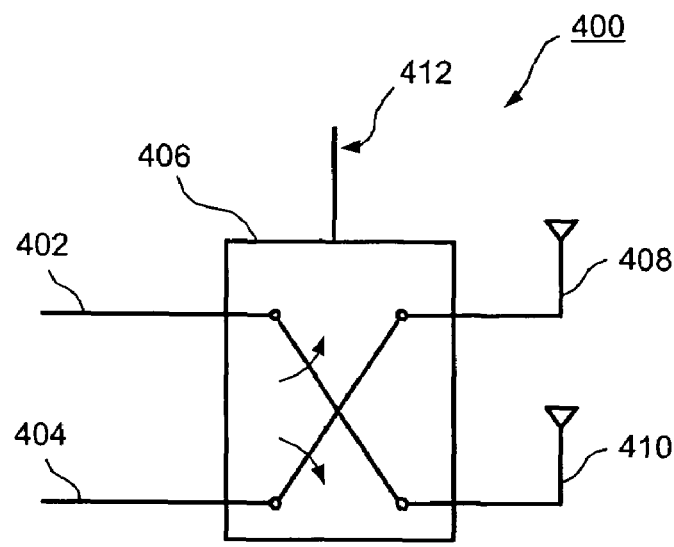
F I G. 4
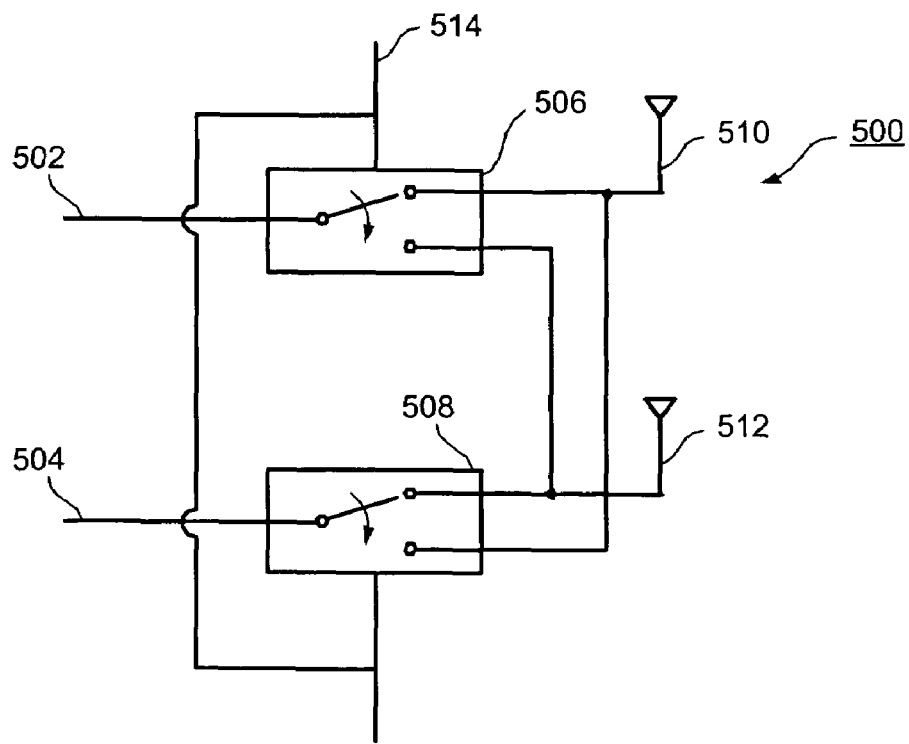
F I G. 5

METHOD FOR SHARING ANTENNAS OF A WIRELESS DEVICE

TECHNICAL FIELD

The present invention relates to handheld devices. More particularly, the present invention relates to antenna configurations mounted on handheld devices and to methods of use of such antenna configurations with multiple radios.

BACKGROUND OF THE INVENTION

Currently, handheld terminals are built to contain multiple radios. One of the radios requires at least two diversity antennas that help mitigate the effects of deep fades. Other radios require only one antenna. For a handheld device to operate without significant degradation in performance there must be significant isolation between the antennas of the multiple radios. 40 decibels (dB) of isolation may be required. Building and operating a handheld terminal with a total of three or more antennas that have significant isolation between each antenna is difficult. The systems that have antenna configurations with three or more antennas, presently used in PDA's, exhibit problems related to increased size, higher cost, interference, poor performance, etc. Previous attempts to build a device with fewer than three antennas have encountered problems due to deep fades.

What are needed are handheld devices that exhibit good performance in smaller sizes, have higher reliability, and exhibit more versatile hardware configurations.

BRIEF SUMMARY OF THE INVENTION

The present invention proposes novel antenna means for handheld devices. The novel antenna means exhibit smaller sizes, good performance, have higher reliability, and novel hardware configurations.

Further, the present invention proposes novel methods of utilization for the antenna means that make the object of the present invention.

An exemplary method of utilization for the antenna means in accordance with the present invention comprises the reception of an 802.11 RF signal on each antenna, an acquisition step, with a radio determining which antenna has the better signal and acquiring the better signal from that antenna for the duration of the packet, and usage by a Bluetooth signal of the remaining antenna.

The foregoing and other features and advantages of the present invention will be apparent from the following more particular description of the preferred embodiments of the invention, as illustrated in the accompanying drawings.

BRIEF DESCRIPTION OF THE DRAWINGS

The present invention is described with reference to the accompanying drawings. In the drawings, like reference numbers indicate identical or functionally similar elements. Additionally, the left most digit(s) of a reference number identifies the drawing in which the reference number first appears.

FIG. 1 is an illustration of a typical transceiver application circuit for a radio that requires diversity antennas.

FIG. 2 is an illustration of a double pole double throw switch.

FIG. 3 is an illustration of an antenna system with a single pole double throw switch with three antennas.

FIG. 4 is an illustration of a converged switch device with two antennas, implemented in accordance with the present invention.

FIG. 5 is an illustration of another embodiment of the present invention implemented using parallel single pole double throw switches.

DETAILED DESCRIPTION OF THE PREFFERED EMBODIMENTS OF THE INVENTION

Figure 6:
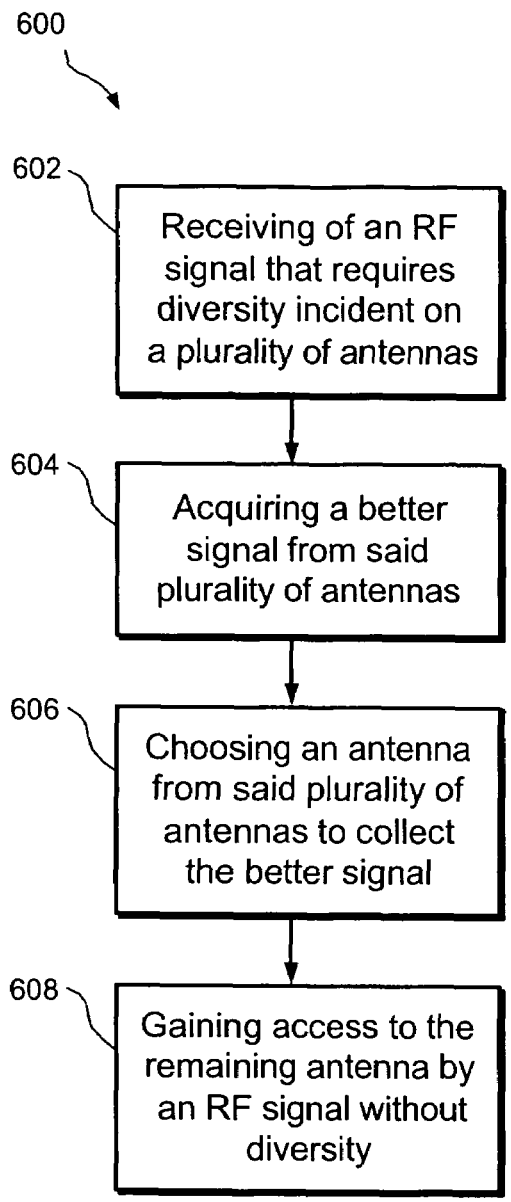
FIG. 6 is a block diagram that reflects the steps of using an antenna assembly comprising two antennas, in accordance with the present invention.

The following detailed description is merely exemplary in nature and is not intended to limit the invention, applications and uses of the invention. Furthermore, the invention is not intended to be limited by any expressed or implied theory presented in the preceding technical field, background, brief summary or the following detailed description.

In the following detailed description of the preferred embodiments, reference is made to the accompanying drawings that form a part thereof, and in which are shown by way of illustration specific embodiments in which the invention may be practiced. It is to be understood that other embodiments may be utilized and structural changes may be made without departing from the scope of the present invention.

FIG. 1 is an illustration of a typical transceiver application circuit for a radio that requires diversity antennas.

Transceiver circuit 100 comprises an antenna block 102, and a RF transceiver block 104. The antenna block 102 comprises two antennas 114 connected by a conventional antenna switch 116. The antenna select control line 108 changes state as the throw 118 switches from antenna to antenna during an acquisition process in the antenna diversity mode. The RF signal line 112 is connected to one of the antennas through throw 118.

The two antennas 114 pertaining to block 102 are difficult to significantly isolate when the antennas are in close proximity. Isolation and control issues also appear in connection with the switch 116 used in antenna block 102. The RF transceiver block 104 comprises a radio transceiver section. The RF transceiver block 104 converts a digital signal to an RF signal for transmission, and demodulates a received RF signal into a digital signal. Line 112 is RF supply line.

The switch 116 utilized in an implementation like the one showed in FIG. 1 can have a plurality of several embodiments. Examples of possible embodiments for switch 116 are single pole double throw switch (SPDT), double pole single throw switch (DPST), and double pole double throw switch (DPDT). In general, the above referenced switches are well isolated and aim to provide for the desired isolation level.

More particularly, for the purposes of the present invention, the pole and throw configurations for the switch can be single pole double throw (SPDT) or double pole double throw (DPDT). The SPDT is a switch that makes or breaks the connection of a single conductor with either one of two other single conductors. This switch typically has three terminals, and is commonly used in pairs and called a "Three-Way" switch. The DPDT is a switch that makes or breaks the connection of two conductors to two separate circuits. This switch typically has four terminals.

Important electrical switch specifications to consider in connection with an elected switch include maximum current rating, maximum AC voltage rating, maximum DC voltage rating, and maximum power rating. Other important parameters to consider include the terminal type, construction materials, common features, and environmental conditions.

FIG. 2 is an illustration of an exemplary double pole double throw switch.

Exemplary double pole double throw switch 200 is utilized for WLANs that operate at 2.4 to 2.5 GHz and 4.8 to 6 GHz. It supports dual mode 802.11 b/g and 802.11 a. Switch 200 is particularly suited for antenna transfer switching between 802.11a and 802.11b/g. It exhibits low insertion loss, low noise for the receive side of the system (Rx), and lower power loss on the transmit side (Rx). High isolation helps to reduce leakage between the Tx and Rx signals. Its high input power handling capability means higher linearity and lower distortion.

Switch 200 exhibits antenna terminals 202 and 204 and input terminals 206 and 208.

FIG. 3 is an illustration of an antenna system with a single pole double throw switch with three antennas.

Antenna system 300 comprises an 802.11 RF signal line 302 connected to SPDT switch 306 that makes a single antenna—single branch connection either with antenna 308 or with antenna 310. Antenna system 300 also comprises another signal line (for example a Bluetooth signal line) 304 that is connected to antenna 312. A plurality of switch control lines, such as 314 and 316, are also present. The switch may be controlled by the 802.11 radio, by the Bluetooth radio, or by a combination of the two.

Typically, the 802.11 chips have "Antenna Select" 314 and "Antenna Deselect" 316 lines that control the SPDT switch that routes the 802.11 signal to the proper antenna. While receiving, the antenna is switched multiple times during a preamble until it acquires a strong signal from one of the antennas. It then decides to use this antenna for the remainder of the incoming packet. At a given instant, only one antenna is being used, while the other antenna is idle. The third antenna is used to transmit and receive the Bluetooth signal.

This three antenna arrangement presents a multitude a challenges to a user because sufficient isolation is difficult to attain and it will be attained at increased cost and at the expense of an increased size.

FIG. 4 is an illustration of a converged switch device with two antennas, implemented in accordance with the present invention.

Converged switch 400 comprises a 802.11 signal line 402, and a Bluetooth signal line 404 entering a DPDT switch 406 that makes a two conductors to two separate circuits connection. The two separate circuits are antenna 408 and antenna 410. A plurality of switch control lines 412 is also present.

If a DPDT switch is used, the currently idle 802.11 antenna is used for transmitting Bluetooth radio signals. Provided that the switch and the antennas have the enough isolation, the two antennas can be used for the dual mode device without sacrificing diversity or performance.

The switch may be controlled by the 802.11 radio, the Bluetooth radio, or a combination of the two.

While the 802.11 transmission occurs, the 802.11 RF signal is sent to antennas 408 and 410 via line 402. Typically, switch 406 will maintain the connection from 802.11 transmit line 402 to the antenna using the best signal compared to a previous signal reception. Therefore, the 802.11 signal on line 402 will be connected either to antenna 408 or 410.

At the same time, the Bluetooth signal is sent using line 404. This Bluetooth radio signal will be routed through switch 406 towards the other antenna. Therefore, both 802.11 and Bluetooth signals can be transmitted or received at the same time using only two antennas.

In the scenario in which 802.11 radio signal reception occurs, the 802.11 RF signal is received by each antenna. Switch 406 changes the connection between lines 402 and each of the antenna lines 408 and 410 until the 802.11 transceiver decides which antenna has a better signal.

Alternatively, the Bluetooth radio signal can be sent using line 404. The radio signal is connected to an antenna that is not currently used by the 802.11 radio signal. The Bluetooth radio signal is then transmitted from the different antennas during the transmission of the same packet. There is a short transition time needed for the antennas to switch. It is between 10 to 100 ns, depending on the switch type. The presence of this short delay does not significantly degrade the performance of the Bluetooth transmission. In this case, the 802.11 antenna is receiving while the Bluetooth antenna is transmitting. Alternatively, the Bluetooth signal could be received on the antenna the 802.11 signal is not currently using. This can change a number of times during the reception of a packet, depending on how quickly the 802.11 radio signal decides which antenna to use. This has also been shown not to significantly degrade the Bluetooth reception. In this case, both the 802.11 and Bluetooth are receiving at the same time.

FIG. 5 is an illustration of another embodiment of the present invention, implemented using parallel single pole double throw switches.

Parallel switch structure 500 comprises two single pole double throw switches 506 and 508 that are either identical or different in configuration and electrical properties. Exemplary embodiment 500 assumes that both SPDT switches 506 and 508 are identical. Structure 500 also comprises an 802.11 radio signal input line 502, a Bluetooth radio signal input line 504, an antenna 510, and another antenna 512. The parallel structure 500 further comprises the necessary electrical hardware to create the cascading switch arrangement.

Both switch—antenna arrangements 400 and 500 eliminate the challenges imposed by the need of isolation between the 801.11 radio signal conducting antennas and the Bluetooth signal antenna by eliminating the third antenna. This arrangement has advantages in what size, cost, and accuracy of reception.

The means of the present invention eliminate the need for a third antenna in the antenna assembly mounted on the portable device. The remaining two antennas use the same switch to exchange between the signals received. This arrangement exhibits several advantages such as size reduction for the antenna assembly and implicitly for the overall handheld device, no interference present between the Rx and the Tx signals, and no more diversity problems. This arrangement is advantageous to be incorporated in several commercial embodiments such as PDA's, telephones, etc.

The present invention is not intended to be limited to the particular scenario of an 802.11 RF signal and implicitly of an radio where diversity is required and an Bluetooth signal and a radio where diversity is not required. Their use in the description made in connection with the subject matter illustrated in the figures of the present invention is only exemplary in nature and does not intend to limit the uses of the present invention to the two radio signals referred above.

FIG. 6 is a block diagram that illustrates the steps of a novel method of use for an antenna according to the present invention.

Method 600 comprises the following steps:

Step 602 is the reception of an 802.11 RF signal on the air incident upon the antennas.

Step 604 is an acquisition step, that consists of toggling between the two diversity antennas, performed by the switch. The toggling is prompted by the RF radio. During the acquisition step testing is performed on the two antennas to determine which antenna is receiving the better signal. The better signal is the stronger signal or the signal with the higher signal to noise ratio.

Step 606 comprises the radio determining which antenna has the better signal and acquiring the signal from that antenna for the duration of the packet.

During step 608 the remaining antenna is assigned to the Bluetooth signal. The Bluetooth radio is either transmitting or receiving.

Figure 7:
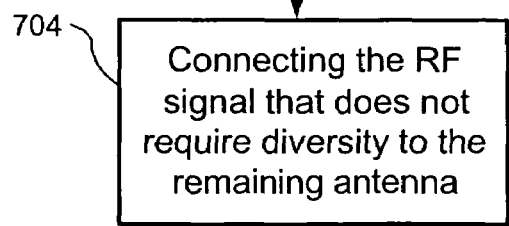
FIG. 7 is another block diagram that illustrates the steps of another embodiment of use for an antenna according to the present invention.

FIG. 7 is another block diagram that illustrates the steps of another embodiment of use for an antenna according to the present invention.

Method 700 is another embodiment of the method of the present invention. In this another embodiment the 802.11 antenna is transmitting and the Bluetooth antenna is either transmitting or receiving.

Steps 602, 604, and 606 are identical in method 700 as with method 600. Step 702 follows step 606 and comprises the transmission from the 802.11 radio to the switch to go to the last known "better" antenna and choose the antenna with the "better signal" on the previous reception.

Further, in step 704 the Bluetooth radio is automatically connected to the other antenna.

It is to be understood that the above description is intended to be illustrative and not restrictive. Many other embodiments will be apparent to one of skill in the art upon reviewing the above description. The scope of the invention should, therefore, be determined with reference to the appended claims, along with the full scope of equivalents which such claims are entitled.

What is claimed is:

1. A method, comprising:
   receiving a radio frequency signal using first and second antennas;
   determining signal characteristics, including a signal strength of the received radio frequency signal;
   selecting one of the first and second antennas as a function of the signal characteristics, wherein the selection maximizes the signal strength of the received radio frequency signal;
   coupling the selected antenna to a first signal line communicating signals according to a first wireless protocol; and
   coupling the non-selected antenna to a second signal line communicating signals according to a second wireless protocol.

2. The method of claim 1, wherein the first and second antennas comprise antenna pairs.

3. The method of claim 1, wherein the radio frequency signal is an IEEE 802.11 signal, the first wireless protocol is an IEEE 802.11 standard and the second wireless protocol is a Bluetooth protocol.

4. The method of claim 1, wherein the signal characteristics include at least one of (i) a signal strength and (ii) a signal to noise ratio.

5. The method of claim 4, wherein the selecting comprises:
   selecting the one of the first and second antennas as a function of a greater of at least one of (i) the signal strength and (ii) the signal to noise ratio exhibited by the received radio frequency signal using the first and second antennas.

6. The method of claim 1, wherein the first and second antennas remain coupled to the respective first and second signal lines for a duration of a packet included in the radio frequency signal.

7. The method of claim 1, further comprising:
   communicating a further radio frequency signal on the non-selected antenna simultaneously with receiving the radio frequency signal.

8. A method, comprising:
   receiving a radio frequency signal using first and second antennas;
   determining signal characteristics, including a signal strength of the received radio frequency signal;
   selecting an antenna from the first and second antennas as a function of the signal characteristics, wherein the selection maximizes the signal strength of the received radio frequency signal;
   coupling the selected antenna to a first signal line communicating signals according to a first wireless protocol;
   coupling the non-selected antenna to a second signal line communicating signals according to a second wireless protocol; and
   after the radio frequency signal has been received, transmitting a further radio frequency signal using the selected antenna.

9. The method of claim 8, wherein the first and second antennas are antenna pairs.

10. The method of claim 8, wherein the radio signal and the further radio signal are IEEE 802.11 signals, the first wireless protocol is an IEEE 802.11 standard and the second wireless protocol is a Bluetooth protocol.

11. The method of claim 8, wherein the signal characteristics include at least one of (i) a signal strength and (ii) a signal to noise ratio.

12. The method of claim 8, wherein the selecting comprises:
   selecting the one of the first and second antennas as a function of a greater of at least one of (i) the signal strength and (ii) the signal to noise ratio exhibited by the received radio frequency signal using the first and second antennas.

13. The method of claim 8, wherein the first and second antennas remain coupled to the first and second signal lines for a duration of a packet included in the radio frequency signal.

14. A method, comprising:
   receiving a first radio frequency signal using first and second antennas;
   determining signal characteristics, including a signal strength of the first radio frequency signal;
   selecting one of the first and second antennas as a function of the signal characteristics, wherein the selection maximizes the signal strength of the first radio frequency signal;
   coupling the selected antenna to a first signal line communicating signals according to a first wireless protocol;
   coupling the non-selected antenna to a second signal line communicating signals according to a second wireless protocol;
   after the first radio frequency signal has been received, transmitting a second radio frequency signal on the selected antenna; and
   receiving, simultaneously with the transmitting, a third radio frequency signal on the non-selected antenna.

15. A device, comprising:
   a first signal line communicating radio frequency signals according to a first wireless protocol;
   a second signal line communicating radio frequency signals according to a second wireless protocol;
   a first antenna receiving a radio frequency signal;
   a second antenna receiving the radio frequency signal;

a microchip detecting signal characteristics, including signal strength, of the received radio frequency signal, the microchip generating a control signal as a function of the signal characteristics; and a switch coupling the first signal line to one of the first and second antennas which is selected as a function of the control signal, the switch simultaneously coupling the second signal line to the other of the first and second antennas.

16. The device of claim 15, wherein the radio frequency signal is an IEEE 802.11 signal, the first wireless protocol is an IEEE 802.11 standard and the second wireless protocol is a Bluetooth protocol.

17. The device of claim 15, wherein the signal characteristics include at least one of (i) a signal strength and (ii) a signal to noise ratio.

18. The device of claim 15, wherein the microchip selects the one of the first and second antennas as a function of a greater of at least one of (i) the signal strength and (ii) the signal to noise ratio exhibited by the received radio frequency signal using the first and second antennas.

19. The method of claim 15, wherein the first and second antennas remain coupled to the first and second signal lines for a duration of a packet included in the radio frequency signal.

20. The device of claim 15, wherein the switch includes two single pole single throw (SPST) switches.

21. The device of claim 15, wherein the switch includes two single pole double throw (SPDT) switches.

22. The device of claim 21, wherein the two SPDT switches are arranged in parallel.

23. The device of claim 15, wherein the switch is a double pole double throw (DBDT) switch.

24. A device, comprising:
a microchip detecting signal characteristics, including a signal strength, of a radio frequency signal received using first and second antennas, the microchip generating a control signal as a function of the signal characteristics, the control signal maximizing the signal strength; and a switch selectively coupling one of the first and second antennas to one of first and second signal lines as a function of the control signal, the switch simultaneously coupling the other of the non-selected antenna to the other of the first and second signal lines, wherein a further radio frequency signal is communicated on the other of the first and second signal lines simultaneously with the receipt of the radio frequency signal; and wherein the first signal line communicates IEEE 802.11 signals and the second signal line communicates Bluetooth signals.

25. The device of claim 24, wherein the switch is one of (i) two single pole single throw (SPST) switches, (ii) two single pole double throw (SPDT) switches and (iii) a double pole double throw (DBDT) switch.

26. The device of claim 24, wherein the signal characteristics include at least one of (i) a signal strength and (ii) a signal to noise ratio.

27. The device of claim 26, wherein the microchip selects the one of the first and second antennas as a function of a greater of at least one of (i) the signal strength and (ii) the signal to noise ratio exhibited by the received radio frequency signal using the first and second antennas.

* * * * *

UNITED STATES PATENT AND TRADEMARK OFFICE
CERTIFICATE OF CORRECTION

PATENT NO. : 7,444,119 B2  
APPLICATION NO. : 11/001537  
DATED : October 28, 2008  
INVENTOR(S) : Bekritsky Page 1 of 1

It is certified that error appears in the above-identified patent and that said Letters Patent is hereby corrected as shown below:

Column 2, Line 14, delete "PREFFERED" and insert -- PREFERRED --, therefor.

Column 7, Line 22, in Claim 19, delete "method" and insert -- device --, therefor.

Column 7, Line 33, in Claim 23, delete "(DBDT)" and insert -- (DPDT) --, therefor.

Column 8, Line 23, in Claim 26, delete "(DBDT)" and insert -- (DPDT) --, therefor.

Signed and Sealed this  
Twenty-seventh Day of September, 2011

David J. Kappos  
*Director of the United States Patent and Trademark Office*